(12) United States Patent
Lovaasen et al.

(10) Patent No.: US 11,331,857 B2
(45) Date of Patent: May 17, 2022

(54) HEATING FIXTURES FOR 5-AXIS PRINTING

(71) Applicant: Raytheon Company, Waltham, MA (US)

(72) Inventors: John D. Lovaasen, Hudson, NH (US); Michael W. Cason, North Chelmsford, MA (US); Ehsan Hajisaeid, Windham, NH (US)

(73) Assignee: Raytheon Company, Waltham, MA (US)

( * ) Notice: Subject to any disclaimer, the term of this patent is extended or adjusted under 35 U.S.C. 154(b) by 207 days.

(21) Appl. No.: 16/888,988

(22) Filed: Jun. 1, 2020

(65) Prior Publication Data

US 2021/0370599 A1    Dec. 2, 2021

(51) Int. Cl.
| | |
|---|---|
| *B29C 64/295* | (2017.01) |
| *B29C 64/245* | (2017.01) |
| *B29C 64/209* | (2017.01) |
| *B29C 64/393* | (2017.01) |
| *G01K 7/02* | (2021.01) |
| *G05D 23/22* | (2006.01) |
| *B33Y 30/00* | (2015.01) |
| *B33Y 50/02* | (2015.01) |

(52) U.S. Cl.
CPC .......... *B29C 64/295* (2017.08); *B29C 64/209* (2017.08); *B29C 64/245* (2017.08); *B29C 64/393* (2017.08); *G01K 7/02* (2013.01); *G05D 23/22* (2013.01); *B33Y 30/00* (2014.12); *B33Y 50/02* (2014.12)

(58) Field of Classification Search
CPC ... B29C 64/295; B29C 64/209; B29C 64/245; B29C 64/393
See application file for complete search history.

(56) References Cited

U.S. PATENT DOCUMENTS

| | | |
|---|---|---|
| 10,603,839 B2 | 3/2020 | Lan |
| 2017/0259501 A1 | 9/2017 | Gandhiraman |
| 2018/0215091 A1 | 2/2018 | Einav et al. |
| 2018/0159037 A1 | 6/2018 | McAlpine |
| 2018/0264750 A1 | 9/2018 | Tierney |
| 2019/0105833 A1 | 4/2019 | Cambron |
| 2019/0134913 A1 | 5/2019 | Buratto |

(Continued)

FOREIGN PATENT DOCUMENTS

| | | |
|---|---|---|
| CN | 210148742 | 3/2020 |
| CN | 111132840 | 5/2020 |

(Continued)

OTHER PUBLICATIONS

International Search Report and Written Opinion dated Jun. 24, 2021 in correspoding International Application No. PCT/US2021/021075.

(Continued)

*Primary Examiner* — Joseph S Del Sole
*Assistant Examiner* — Mohamed K Ahmed Ali
(74) *Attorney, Agent, or Firm* — Renner, Otto, Boisselle & Sklar, LLP (57) ABSTRACT

A heated fixture for a multi-axis stage to improve drying of the printing compound and to enable faster movement speeds of the stage. The fixture includes a base that attaches to a multi-axis stage of a three-dimensional (3D) printer, a stands supporting a printing substrate and a heater, a temperature sensor, and a temperature controller.

20 Claims, 5 Drawing Sheets

(56) References Cited

U.S. PATENT DOCUMENTS

| | | |
|---|---|---|
| 2020/0047401 A1 | 2/2020 | Yu |
| 2020/0130263 A1 | 4/2020 | Günther et al. |
| 2020/0188942 A1 | 6/2020 | Song |

FOREIGN PATENT DOCUMENTS

| | | |
|---|---|---|
| CN | 111168995 | 5/2020 |
| TW | 201420301 | 6/2014 |
| WO | 2017189904 | 2/2017 |
| WO | 2021017573 | 4/2021 |

OTHER PUBLICATIONS

Office Action dated Nov. 11, 2021 in corresponding Taiwanese Patent Application No. 110108338.

HEATING FIXTURES FOR 5-AXIS PRINTING

TECHNICAL FIELD

The present disclosure relates generally to three-dimensional (3D) printing and more particularly to heating fixtures for 5-axis printing stages.

BACKGROUND

Three-dimensional (3D) printers frequently use multi-axis stages to orient a printing surface relative to a print head. A popular multi-axis stage is a 5-axis stage that enables re-positioning of a substrate along all 5 axes during printing. For example, aerosol jet printers are a specific type of 3D printers used for printing electronics. Aerosol jet printers aerosolize and spray functional materials (e.g., conductive inks, dielectrics, polymers, adhesives, etc.) onto a substrate.

SUMMARY

When repositioning a substrate while three-dimensional (3D) printing, it is important to ensure that the printing compound does not run during movement of the substrate. For example, when using conductive ink and a 5-axis stage, movement of the stage should be limited to allow the conductive ink to sufficiently harden such that the ink does not run during movement of the stage.

Many printing materials used in 3D printing need to be printed on to a heated substrate to allow the printing compound to dry and to prevent the printing compound from running. Heating the substrate indirectly by heating the printing chamber (i.e., the environment surrounding the substrate) is not preferred for many applications (e.g., when printing using aerosolized particles suspended in a liquid), because the ambient environment may dry out the printing compound before the printing compound reaches the substrate.

The present invention provides a heated fixture for a multi-axis stage to improve drying of the printing compound and to enable faster movement speeds of the stage.

According to one aspect, a heated fixture is provided. The heated fixture includes a base, a stand, a temperature sensor, and a temperature controller. The base is configured to mechanically couple to a 5-axis stage. The stand includes a support surface configured to support a printing substrate and to be thermally coupled to the printing substrate. The stand also includes a mating structure configured to mechanically couple with the base, such that the stand is detachable from the base and such that a position of the stand is maintained relative to the 5-axis stage. The body further includes a body and a heater. The body is thermally coupled to the support surface and the heater is thermally coupled to the body, such that thermal energy generated by the heater is exchanged with the printing substrate via the body and the support surface. The temperature sensor is configured to measure a first temperature related to a second temperature of the printing substrate. The temperature controller configured to modulate electrical power supplied to the heater based on the first temperature measured by the temperature sensor.

Alternatively or additionally, the heater is a film heater.

Alternatively or additionally, the body includes a first body portion of the thermally conductive material and a second body portion of the thermally conductive material and wherein the heater is located between the first body portion and the second body portion.

Alternatively or additionally, the heater is positioned in contact with both a lateral surface of the first body portion and to a lateral surface of the second body portion.

Alternatively or additionally, the support surface is located on a surface of the first body portion and the first body portion and the second body portion are positioned relative to one another such that the support surface extends past the second body portion in a direction away from the base along a longitudinal axis of the stand.

Alternatively or additionally, the heater is a polyimide film heater.

Alternatively or additionally, the heater is located at a distance from the support surface along a longitudinal axis of the stand.

Alternatively or additionally, the heater is a cartridge heater.

Alternatively or additionally, the heater is located within a bore of the body.

Alternatively or additionally, the base is mechanically coupled to the 5-axis stage via fasteners.

Alternatively or additionally, the support surface is mechanically coupled with a coupling surface of the printing substrate.

Alternatively or additionally, the support surface is shaped to match a contour of the coupling surface of the printing substrate.

Alternatively or additionally, the stand further includes a thermal insulator located adjacent an outer surface of the body and wherein the thermal insulator is configured to retard exchange of thermal energy between the body and an environment in which the body is located.

Alternatively or additionally, the temperature sensor is a thermocouple.

Alternatively or additionally, the temperature controller modulates the electrical power supplied to the heater, such that the output of the temperature sensor is maintained at a temperature less than a controlled temperature.

Alternatively or additionally, the body and support surface are made of copper or aluminum.

Alternatively or additionally, the 5-axis stage includes electrical connectors and the heated fixture further comprises electrical contacts configured to establish electrical connection with the electrical connectors of the 5-axis stage, such that the heater receives electrical power from the 5-axis stage.

According to another aspect, a heated fixture is provided. The heated fixture includes a base, a stand, a temperature sensor, and a temperature controller. The base is configured to mechanically couple to a 5-axis stage. The stand includes a support surface, a mating structure, a body, and a film heater. The support surface is configured to support a printing substrate and to be thermally coupled to the printing substrate. The mating structure is configured to mechanically couple with the base, such that the stand is detachable from the base and such that a position of the stand is maintained relative to the 5-axis stage. The body is thermally coupled to the support surface and including a first body portion and a second body portion. The support surface is located on a surface of the first body portion. The first body portion and the second body portion are positioned relative to one another such that the support surface extends past the second body portion in a direction away from the base along a longitudinal axis of the stand. The film heater is located between and in contact with both the first body portion and the second body portion, such that thermal energy generated by the heater is exchanged with the printing substrate via the body and the support surface. The temperature sensor is configured to measure a first temperature related to a second temperature of the printing substrate. The temperature controller configured to modulate electrical power supplied to the heater based on the first temperature measured by the temperature sensor.

According to a further aspect, a printer is provided. The printer includes a 5-axis stage, a printing substrate, and the heated fixture.

Alternatively or additionally, the printer additionally includes a print head configured to output aerosolized printing materials onto the printing substrate.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

FIG. 1 is a schematic top view of a rectangular printing substrate, a 5-axis stage, and a heated fixture.

FIG. 2 is a side view of the rectangular printing substrate, the 5-axis stage, and the heated fixture of FIG. 1.

FIG. 3 is a front view of the rectangular printing substrate, the 5-axis stage, and the heated fixture of FIG. 1.

FIG. 4 is an oblique view of the rectangular printing substrate, the 5-axis stage, and the heated fixture of FIG. 1.

FIG. 5 is a front view of a stand separated from a base of the heated fixture of FIG. 1.

FIG. 6 is a cross sectional view of the base and the stand of the heated fixture of FIG. 1.

FIG. 7 is a top view of a hollow cylindrical printing substrate, a 5-axis stage, and a heated fixture.

FIG. 8 is a side view of the hollow cylindrical printing substrate, the 5-axis stage, and the heated fixture of FIG. 7.

FIG. 9 is an oblique view of the hollow cylindrical printing substrate, the 5-axis stage, and the heated fixture of FIG. 7.

FIG. 10 is a side view of a conical printing substrate, a 5-axis stage, and a heated fixture.

FIG. 11 is a top view of the conical printing substrate, the 5-axis stage, and the heated fixture of FIG. 10.

FIG. 12 is an oblique view of the conical printing substrate, the 5-axis stage, and the heated fixture of FIG. 10.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

According to a general embodiment, a heated fixture for a multi-axis stage is provided to improve drying of the printing compound and to enable faster movement speeds of the stage. The fixture includes a base that attaches to a multi-axis stage of a three-dimensional (3D) printer, a stand supporting a printing substrate and a heater, a temperature sensor, and a temperature controller.

Turning to FIGS. 1-4, a heated fixture 10 for supporting a printing substrate 12 relative to a 5-axis stage 14 is shown. The heated fixture 10 includes a base 22, a stand 24, a temperature sensor 26, and a temperature controller 28. The base 22 is configured to mechanically couple to the 5-axis stage 14. The stand 24 includes a support surface 30 that supports the printing substrate 12 and that is thermally coupled to the printing substrate 12. The stand 24 also includes a body 32 and a heater 34. The body 32 is thermally coupled to the support surface 30 and the heater 34 is thermally coupled to the body 32, such that thermal energy generated by the heater 34 is exchanged with the printing substrate 12 via the body 32 and the support surface 30. The temperature sensor 26 measures a temperature related to a temperature of the printing substrate 12. The temperature controller 28 modulates electrical power supplied to the heater 34 based on the temperature measured by the temperature sensor 26.

In the embodiment shown in FIGS. 1-6, the stage translates in the x direction 50, the y direction 52, and the z direction 54, and rotates about the x-y plane 56 (also referred to as yaw) and about the x-z plane 58 (also referred to as pitch). In other embodiments, the stage is a trunnion 5-axis stage including a gimbal that rotates about the x-y plane 56 and a trunnion swinging arm that rotates about the x-z plane 58.

In the depicted embodiment, the base 22 is mechanically coupled to the 5-axis stage 14 via fasteners. For example, the base 22 may be fixed to the 5-axis stage 14 via screws or an adhesive attached to a rotating platform 40 of the 5-axis stage. The base 22 is fixed to the 5-axis stage, such that movement of the 5-axis stage results in a corresponding movement of the printing substrate 12. The base 22 may be made of any suitable material (e.g., metal and/or plastic).

In addition to the support surface 30 and the body 32, the stand 24 also includes a mating structure 36 configured to mechanically couple with the base 22, such that the stand 24 is detachable from the base 22 and such that a position of the stand 24 is maintained relative to the 5-axis stage 14. In one embodiment, the stand 24 is detachable from the base 22 such that differently shaped stands 24 may be connected to the base 22. As is described in further detail below, the stand 24 may have different shapes depending on the printing substrate 12.

As shown in FIG. 5, the mating structure 24 may comprise an extension of the body 32 that is received in a corresponding structure 25 of the base 22. In the cross section of the base 22 and the mating structure 24 in FIG. 6, the mating structure 36 is a pentagonal extension of the body 32 and the corresponding structure 25 of the base 22 is a pentagonal opening in the base 22. In one embodiment, the mating structure 24 may be fasteners for rigidly connecting the stand 24 to the base 22.

The stand 24 is thermally coupled to the printing substrate 12, such that thermal energy is exchanged between the support surface 30 and the printing substrate 12. The body 32 is similarly thermally connected to the support surface, such that thermal energy is exchanged between the body and the support surface.

To improve heat transfer between the heater 34 and the printing substrate 12, the body 32 of the stand 24 is made, in one embodiment, of a thermally conductive material having a thermal conductivity in the range of 205 W/mK to 385 W/m K. For example, the body 32 and/or support surface 30 may be made of aluminum and/or copper.

Figure 1:
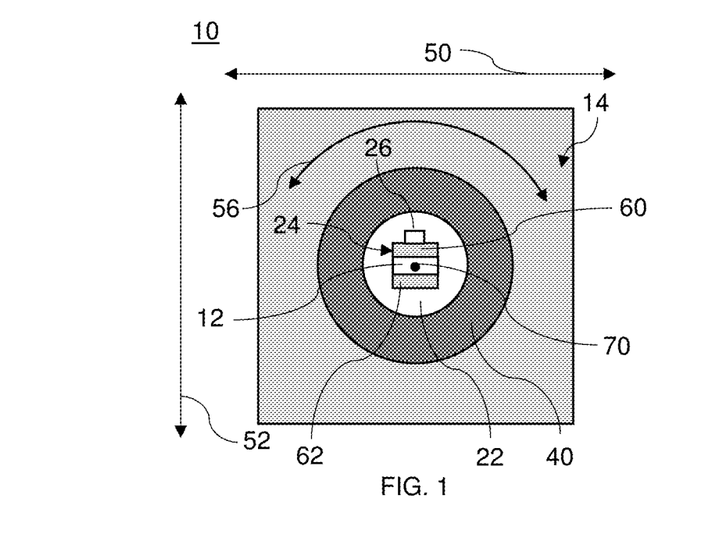
Figure 2:
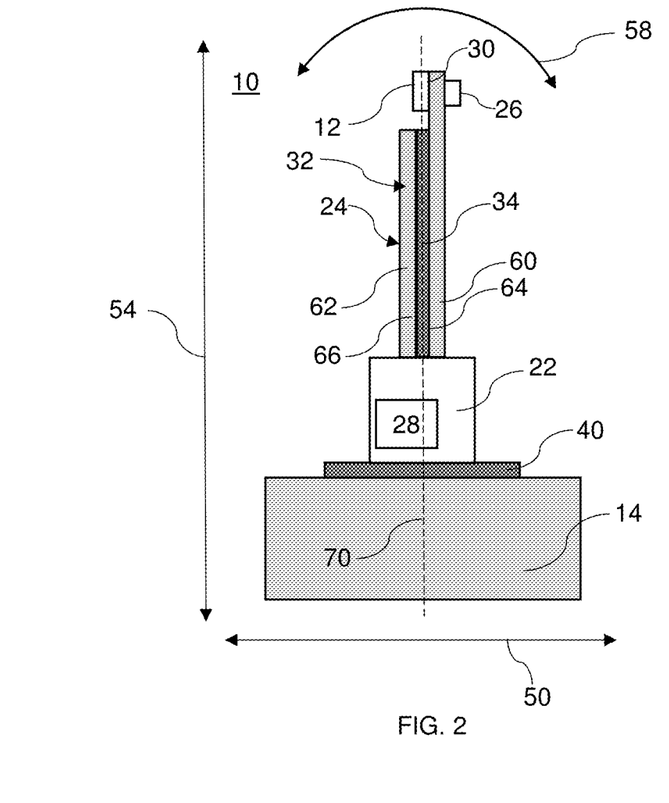
Figure 3:
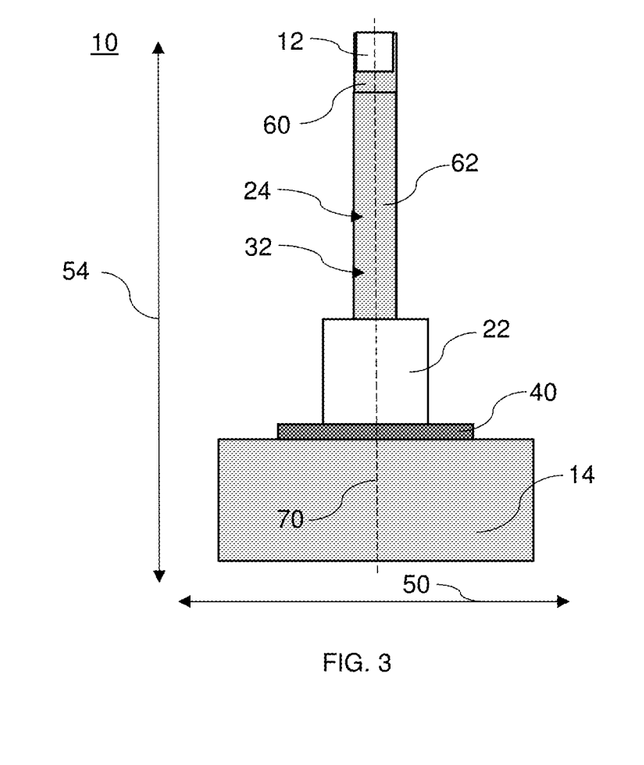
Figure 4:
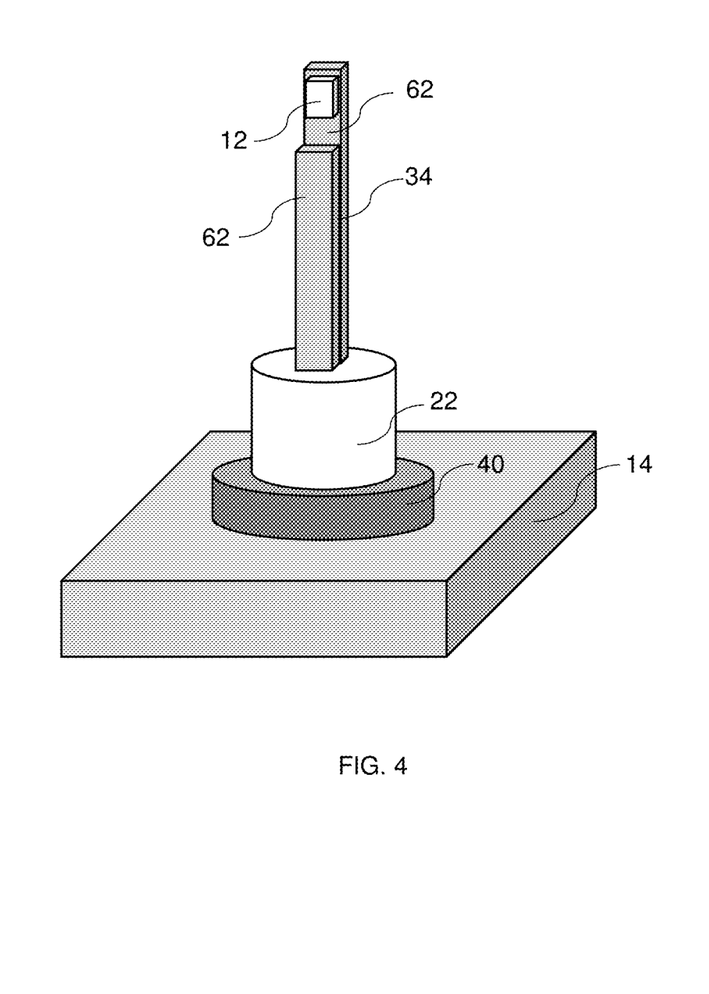
Figure 5:
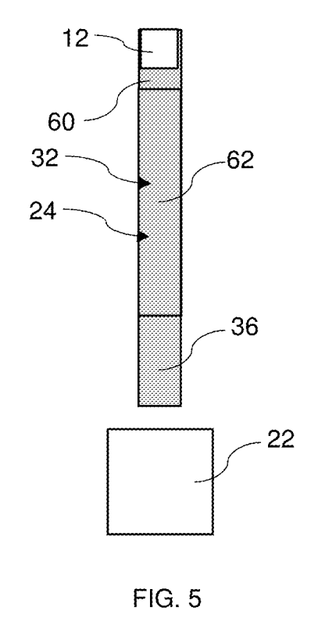
Figure 6:
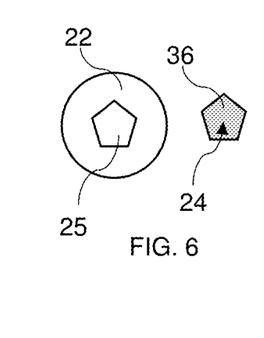
Figure 7:
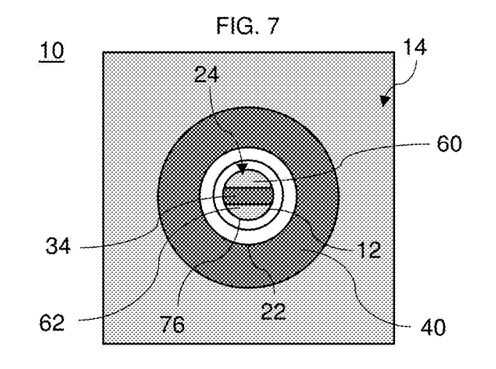
Figure 8:
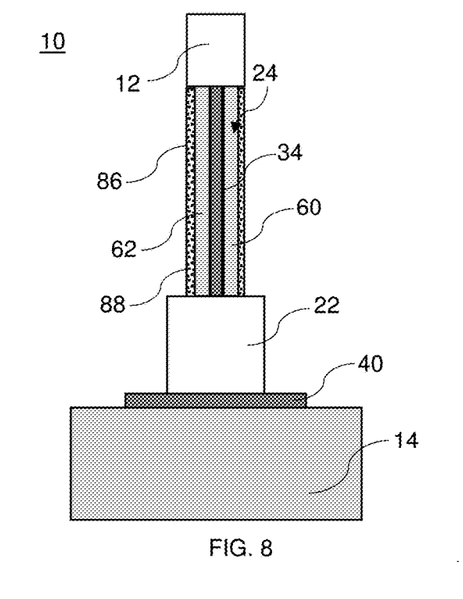
Figure 9:
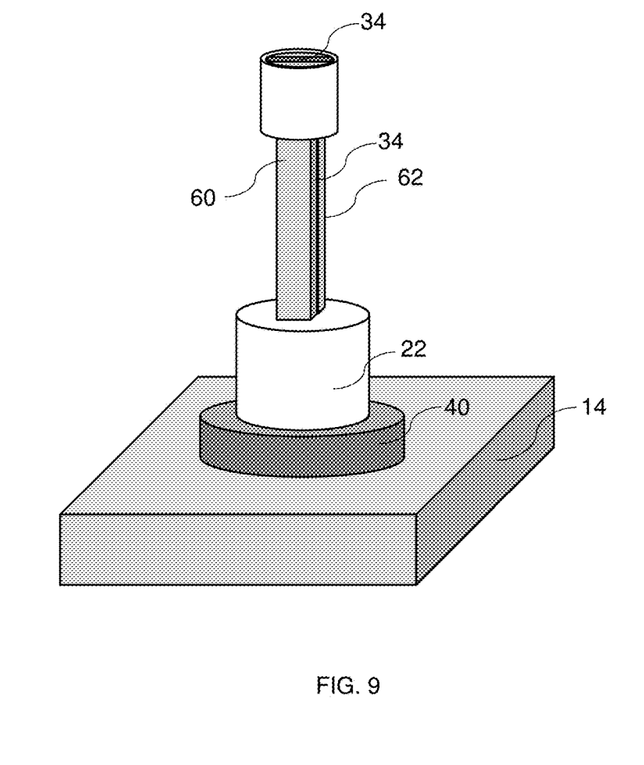

A portion of the heater 34 may be positioned in close proximity to the support surface 30 to improve heat transfer between the heater 34 and the printing substrate 12. In the embodiment depicted in FIGS. 1-6, the heater 34 is located close to, but at a distance from the support surface 30 along a longitudinal axis 70 of the stand 24 (e.g., 1-5 mm). In the embodiment depicted in FIGS. 7-9, the heater 34 is located on a surface of the body 32 directly opposite the support surface 30.

In the embodiment depicted in FIGS. 1-6, the body 32 includes a first body portion 60 and a second body portion 62. The heater 34 is located between the first body portion 60 and the second body portion 62. For example, the heater 34 may be a film heater such as a polyimide film heater. In the depicted embodiment, the heater 34 is positioned in contact with both a lateral surface 64 of the first body portion 60 and a lateral surface 66 of the second body portion 62. In the depicted embodiment, the support surface 30 is located on a surface of the first body portion 60. The first body portion 60 and the second body portion 62 are positioned relative to one another such that the support surface 30 extends past the second body portion 62 in a direction away from the base 22 along a longitudinal axis 70 of the stand 24. Conversely, in the embodiment shown in FIGS. 7-9, the support surface 30 is positioned opposite the printing substrate 12, such that only the body 32 is located between the heater 34 and the printing substrate 12.

Figure 11:
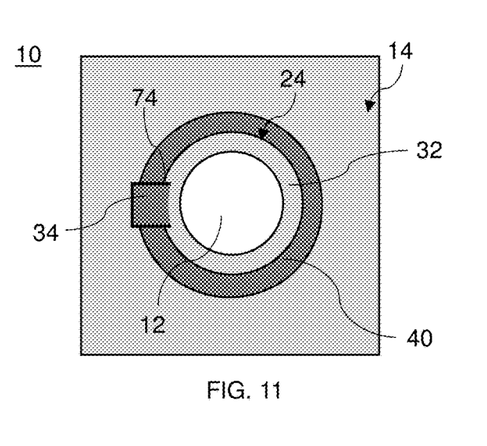
Figure 12:
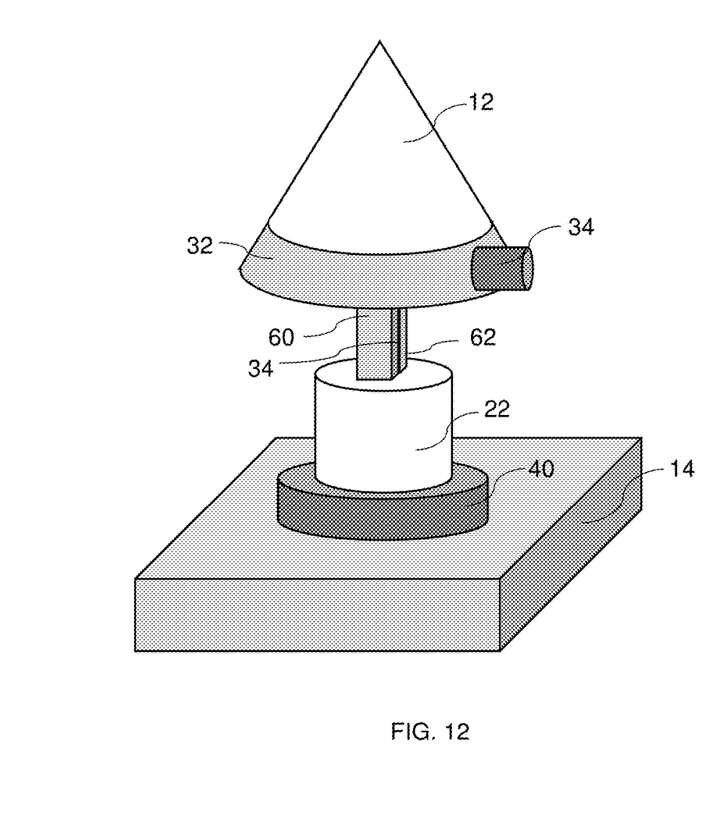

In both the embodiments depicted in FIGS. 1-9, the heater 34 is a film heater. In the embodiment depicted in FIGS. 10-12, the heater 34 is a cartridge heater located within a bore 74 of the body 32.

Figure 10:
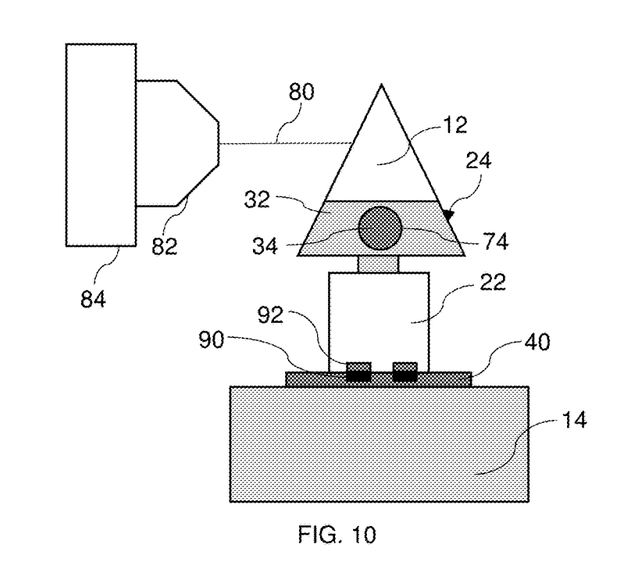

In the depicted embodiments, the support surface 30 is mechanically coupled with a coupling surface 76 of the printing substrate 12. For example, the printing substrate 12 may be press fit onto the support surface 30 or the printing substrate 12 may be attached to the support surface 30 using an adhesive (e.g., glue, double sided tape, etc.), a clip, or any other suitable fastener. As shown in FIG. 10, the printing substrate 12 may refer to any surface or material onto which printing compound 80 is deposited by a printhead 82 of the 3D printer 84.

In the embodiments shown in FIGS. 7-12, the support surface 30 is shaped to match a contour of the coupling surface 76 of the printing substrate 12. In the embodiment shown in FIGS. 7-9, the printing substrate 12 is a hollow cylinder and the support surface 30 has a cylindrical shape that fits inside the printing substrate 12. Similarly, in the embodiment shown in FIGS. 10-12, the printing substrate 12 is a hollow cone and the support surface 30 has a conical shape that fits inside the printing substrate 12. By the support surface 30 having a shape that matches a contour of at least a part of the printing substrate 12, the heated fixture 10 enables greater heat transfer to the printing substrate 12.

As described above, the heated fixture 10 includes a temperature sensor 26 that measures a temperature related to a temperature of the printing substrate 12. The temperature sensor 26 may take the form of thermocouple or any suitable device for measuring temperature. For example, the temperature sensor 26 may be a contactless thermometer (e.g., an infrared (IR) camera) or a thermometer in physical contact with at least one of the printing substrate 12, the support surface 30, or the body 24. In one embodiment, the temperature sensor 26 is located between the printing substrate 12 and the support surface 30 and is in physical contact with the printing substrate 12. In the embodiment shown in FIG. 2, the temperature sensor 26 is in physical contact with a surface of the body 32 opposite the support surface 30.

The temperature controller 28 modulates electrical power supplied to the heater 34 based on the temperature measured by the temperature sensor 26. In one embodiment, the temperature controller 28 modulates the electrical power supplied to the heater 34, such that the output of the temperature sensor 26 is maintained at a temperature less than a controlled temperature. The controlled temperature may be set to any suitable value. For example, the controlled temperature may be 150° C., 200° C., a melting temperature of the printing substrate, or a glass transition temperature of the printing substrate.

The temperature controller 28 may have various implementations. For example, the temperature controller 28 may include any suitable device, such as a processor (e.g., CPU), programmable circuit, integrated circuit, memory and I/O circuits, an application specific integrated circuit, microcontroller, complex programmable logic device, other programmable circuits, or the like. The temperature controller 28 may also include a non-transitory computer readable medium, such as random access memory (RAM), a read-only memory (ROM), an erasable programmable read-only memory (EPROM or Flash memory), or any other suitable medium.

To stabilize the temperature of the stand 24, the stand 24 may include a thermal insulator 86 located adjacent an outer surface 88 of the body 32. The thermal insulator 86 is configured to retard exchange of thermal energy between the body 32 and an environment in which the body 32 is located. The thermal insulator 86 may have a thermal conductivity of less than 0.045 W/mK.

The heater 34 may receive electrical power using wires terminating in a power supply outside of the 5-axis stage 14. These wires may limit rotation of the 5-axis stage 14 to prevent tangling of the wires. For example, the 5-axis stage 14 may be limited to rotating at most 1000° in one direction before rotating back in the opposite direction. In one embodiment, the heater 34 receives power from electrical connections 90 included in the 5-axis stage 14. The heated fixture 14 similarly includes electrical contacts 92 that establish electrical connection with the electrical connectors 90 of the 5-axis stage, such that the heater 34 receives electrical power from the 5-axis stage 14. In this embodiment, because the heater 34 receives electrical power from the 5-axis stage as opposed to an external power supply, wire tangling may be avoided, such that rotation of the 5-axis stage 14 does not need to be limited.

As described above, FIG. 10 shows a printer 80 (e.g., a 3D printer) including a 5-axis stage 14, a printing substrate 12, and the heated fixture 10. In the previously described embodiments, the heated fixture 14 may be an after market accessory added to an existing printer 80. In this embodiment, the heated fixture 14 may be included with the printer 80. For example, the base 22 of the heated fixture 14 may be permanently fixed to the 5-axis stage 14 and/or may be integral to the 5-axis stage 14.

As described above, the printer 80 may output aerosolized printing materials 80 onto the printing substrate 12 via the print head 82. In one embodiment, the aerosolized printing material is an electrically conductive ink.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A heated fixture comprising:
   a base configured to mechanically couple to a 5-axis stage;
   a stand including:
     a support surface configured to support a printing substrate and to be thermally coupled to the printing substrate;
     a mating structure configured to mechanically couple with the base, such that the stand is detachable from the base and such that a position of the stand is maintained relative to the 5-axis stage;
     a body thermally coupled to the support surface; and
     a heater thermally coupled to the body, such that thermal energy generated by the heater is exchanged with the printing substrate via the body and the support surface;
   a temperature sensor configured to measure a first temperature related to a second temperature of the printing substrate; and
   a temperature controller configured to modulate electrical power supplied to the heater based on the first temperature measured by the temperature sensor.

2. The heated fixture of claim 1, wherein the heater is a film heater.

3. The heated fixture of claim 2, wherein the body includes a first body portion of the thermally conductive material and a second body portion of the thermally conductive material and wherein the heater is located between the first body portion and the second body portion.

4. The heated fixture of claim 3, wherein the heater is positioned in contact with both a lateral surface of the first body portion and to a lateral surface of the second body portion.

5. The heated fixture of claim 3, wherein the support surface is located on a surface of the first body portion and the first body portion and the second body portion are positioned relative to one another such that the support surface extends past the second body portion in a direction away from the base along a longitudinal axis of the stand.

6. The heated fixture of claim 2, wherein the heater is a polyimide film heater.

7. The heated fixture of claim 1, wherein the heater is located at a distance from the support surface along a longitudinal axis of the stand.

8. The heated fixture of claim 1, wherein the heater is a cartridge heater.

9. The heated fixture of claim 8, wherein the heater is located within a bore of the body.

10. The heated fixture of claim 1, wherein the base is mechanically coupled to the 5-axis stage via fasteners.

11. The heated fixture of claim 1, wherein the support surface is mechanically coupled with a coupling surface of the printing substrate.

12. The heated fixture of claim 11, wherein the support surface is shaped to match a contour of the coupling surface of the printing substrate.

13. The heated fixture of claim 1, wherein the stand further includes a thermal insulator located adjacent an outer surface of the body and wherein the thermal insulator is configured to retard exchange of thermal energy between the body and an environment in which the body is located.

14. The heated fixture of claim 1, wherein the temperature sensor is a thermocouple.

15. The heated fixture of claim 1, wherein the temperature controller modulates the electrical power supplied to the heater, such that the output of the temperature sensor is maintained at a temperature less than a controlled temperature.

16. The heated fixture of claim 1, wherein the body and support surface are made of copper or aluminum.

17. The heated fixture of claim 1, wherein the 5-axis stage includes electrical connectors and the heated fixture further comprises electrical contacts configured to establish electrical connection with the electrical connectors of the 5-axis stage, such that the heater receives electrical power from the 5-axis stage.

18. A heated fixture comprising:
   a base configured to mechanically couple to a 5-axis stage;
   a stand including:
     a support surface configured to support a printing substrate and to be thermally coupled to the printing substrate;
     a mating structure configured to mechanically couple with the base, such that the stand is detachable from the base and such that a position of the stand is maintained relative to the 5-axis stage;
     a body thermally coupled to the support surface and including a first body portion and a second body portion, wherein the support surface is located on a surface of the first body portion and wherein the first body portion and the second body portion are positioned relative to one another such that the support surface extends past the second body portion in a direction away from the base along a longitudinal axis of the stand; and
     a film heater located between and in contact with both the first body portion and the second body portion, such that thermal energy generated by the heater is exchanged with the printing substrate via the body and the support surface;

a temperature sensor configured to measure a first temperature related to a second temperature of the printing substrate; and
a temperature controller configured to modulate electrical power supplied to the heater based on the first temperature measured by the temperature sensor.

19. A printer comprising:
a 5-axis stage;
a printing substrate; and
the heated fixture of claim 18.

20. The printer of claim 19, further comprising a print head configured to output aerosolized printing materials onto the printing substrate.

* * * * *